J. P. Adams,
Cider Mill.
No 39,620.   Patented Aug. 25, 1863.
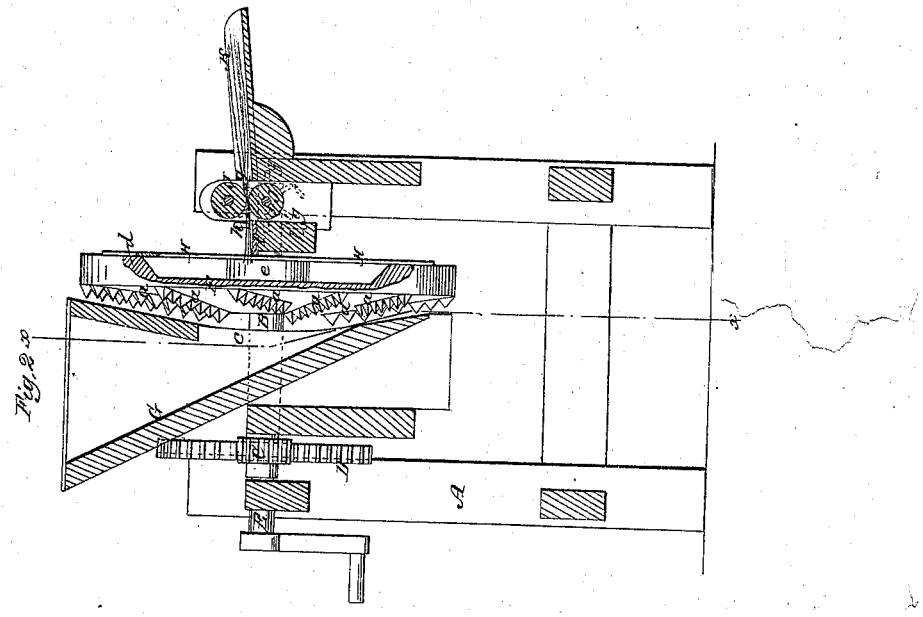
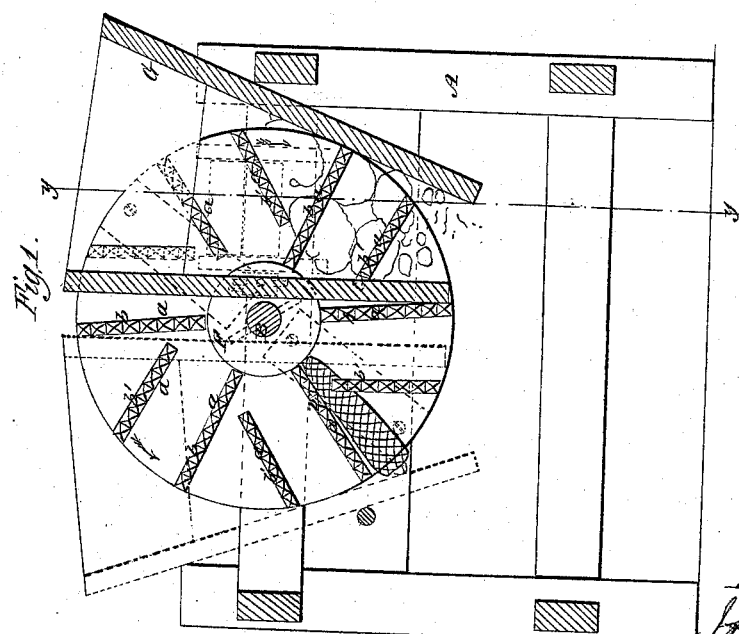
Witnesses.
Inventor.

UNITED STATES PATENT OFFICE.

JAMES P. ADAMS, OF CHESTER, ILLINOIS.

IMPROVED MODE OF COMBINING CIDER-MILLS, CORN-SHELLERS, AND FODDER-CUTTERS.

Specification forming part of Letters Patent No. 39,620, dated August 25, 1863; antedated February 9, 1863.

*To all whom it may concern:*

Be it known that I, JAMES P. ADAMS, of Chester, in the county of Randolph and State of Illinois, have invented a new and Improved Arrangement of Means for Combining a Cider-Mill, Corn-Sheller, and Fodder-Cutter; and I do hereby declare that the following is a full, clear, and exact description of the same, reference being had to the accompanying drawings, making a part of this specification, in which—

Figure 1 is a side sectional view of my invention, taken in the line $x\,x$, Fig. 2. Fig. 2 is a transverse vertical section of the same, taken in the line $y\,y$, Fig. 1.

Similar letters of reference indicate corresponding parts in the two figures.

This invention consists in combining a wheel provided with cutters and a beveled toothed side with a reversible hopper and feed-rollers, all arranged in such a manner that corn may be shelled from the ear, apples cut or ground for manufacturing cider, and straw, stalks, hay, &c., cut for fodder.

To enable those skilled in the art to fully understand and construct my invention, I will proceed to describe it.

A represents a framing, which may be of rectangular form, and has a shaft, B, placed transversely in its upper part. The shaft B is provided at one end with a pinion, C, into which a wheel, D, gears, the latter being on a driving-shaft, E. On the shaft B there is secured a wheel, F, the inner side of which is beveled and provided with teeth $a$, which are placed in lines or rows on the beveled surface, as shown in Fig. 1. The lines or rows $b$ have a radial position on the wheel, while the rows $b'$ have a tangential position relatively with the shaft B. The wheel F is of cast-iron, and the teeth, of course, cast with it.

G is a hopper, which is placed in the upper part of the framing, and is of V form in its transverse section, as shown clearly in Fig. 2. The side of the hopper which adjoins the wheel F is open at its lower part, as shown at $c$. The outer side of the wheel F is provided with a flange, $d$, to which and the hub $e$ of the wheel knives or cutters H H are attached. These knives or cutters are in line with each other, and when the wheel F rotates they work or pass over the edge of a leger-knife, I, which is secured to the upper part of the framing in the same plane with the "bite" of two feed-rollers, J J, as shown in Fig. 2. The feed-rollers J J are placed one over the other in the same axial plane, and one of them has its shaft $f$ provided at one end with radial arms $g$, with which similar arms, $h$, on the shaft B of wheel E come in contact as said wheel F rotates. (See Fig. 2.)

K is a feed-spout, which is attached to the framing A in a slightly inclined position and in line with the rollers J J.

The operation of the machine is as follows: When apples are to be ground or crushed, they are placed in the hopper G and the wheel F rotated in the direction indicated by the black arrow in Fig. 1. The teeth $a$ as the wheel F rotates force the apples down in the hopper and cut or grind them without the employment of any feeding mechanism. The teeth $a$, which are quite close together in the lines or rows, reduce the apples to a quite fine pulp, so that the juice may be very readily expressed by a moderate application of power and all the juice obtained.

In shelling corn the hopper G is removed, so as to be at the opposite side of the shaft B of the wheel F, and said wheel is rotated in a reverse direction, as indicated by the red arrow in Fig. 1. The ears of corn are placed in the hopper G, and as the wheel F rotates the teeth $a$ shell the corn from the ears. The teeth in the radial lines or rows $b$ perform the chief part of the shelling operation, the tangential or oblique rows $b'$ serving rather to prevent the escape of the ears from the hopper until the corn is entirely shelled from them.

The position of the hopper when the machine is used as a corn-sheller is shown in red in Fig. 1.

The operation of cutting straw, stalks, hay, &c., will be fully understood by referring to Fig. 2. The substance to be cut is placed in the spout K, and is fed by the rollers J J to the knives or cutters H H. The movement of the rollers J J is intermittent, an arm, $h$, of shaft B striking an arm, $g$, of the lower roller, J, just after each knife or cutter H passes the leger blade or knife I. The rollers, therefore, and consequently the substance being cut, are at rest while the knives are cutting the feed, movement being given the substance to be cut during the intervals between the cuts. This is an essential feature in fodder cutting machines.

I no not claim, separately, any of the parts herein shown and described. The bevel-toothed shelling and grinding wheel has been used, and also the fodder-cutting device, although with a different feeding mechanism.

Having thus described my invention, what I claim as new, and desire to secure by Letters Patent, is—

The wheel F, provided at one side with a beveled surface having radial and tangential rows of teeth $b\ b'$, and at the opposite side with knives or cutters H H, in combination with the reversible hopper G, leger blade or cutter I, and feed-rollers J J, operated from the shaft B, as shown, all arranged as and for the purposes herein set forth.

JAMES P. ADAMS

Witnesses:
JAMES M. RALLE,
JAMES C. HOLBROOK.